United States Patent [19]
Blanie

[11] 3,979,839
[45] Sept. 14, 1976

[54] DRUG INTERACTION SYSTEM

[76] Inventor: Paul Marie Michel Jean Blanie, 282, rue Saint Jacques, a Paris 5 eme, France

[22] Filed: Dec. 18, 1974

[21] Appl. No.: 533,819

[30] Foreign Application Priority Data
  Jan. 8, 1974  France .............................. 74.00627
  May 31, 1974  France .............................. 74.18937
  Aug. 30, 1974  France .............................. 74.32797

[52] U.S. Cl............................. 35/17; 235/61.12 R
[51] Int. Cl.² ................... G09B 23/28; G06K 19/00
[58] Field of Search .................. 35/17; 235/61.12 R, 235/61.12 N, 61.12 C, 61.12 M

[56] References Cited
UNITED STATES PATENTS

| 1,526,717 | 2/1925 | Nunez ..................................... 35/17 |
| 1,988,634 | 1/1935 | Stonecypher ........................... 35/17 |
| 2,248,162 | 7/1941 | DeAraujo ................................ 35/17 |
| 2,914,746 | 11/1959 | James...................... 235/61.12 M X |
| 3,186,111 | 6/1965 | Lawlor ................................... 35/17 |
| 3,328,563 | 6/1967 | Kollar ................................. 35/17 X |
| 3,480,763 | 11/1969 | Gantner.............................. 35/17 X |
| 3,636,317 | 1/1972 | Torrey ........................ 235/61.12 N |
| 3,654,435 | 4/1972 | Vaccaro ...................... 235/61.12 M |

FOREIGN PATENTS OR APPLICATIONS

| 1,364,088 | 5/1964 | France .................................... 35/17 |
| 851,604 | 10/1960 | United Kingdom .......... 235/61.12 N |

*Primary Examiner*—Harland S. Skogquist
*Attorney, Agent, or Firm*—Oblon, Fisher, Spivak, McClelland & Maier

[57] ABSTRACT

A device for determining the nature of relationships between on the one hand data peculiar to one unit or a group of separate units, and on the other hand data of another unit or another group of separate units pertaining to the same assembly, includes a transparent support corresponding to each unit or group of units, each support being arranged by means of a matrix of addresses, wherein on the support corresponding to each unit or groups of separate units are inscribed, at any address, corresponding to the data peculiar to the other units or group of separate units, one or more symbols distinctive of each nature of relationship between the data peculiar to the unit or groups of separate units corresponding to each support and the data peculiar to the other units or groups of units of the assembly. This permits the symbols to be simultaneously read when superimposing the cards corresponding to the relationship to be studied.

42 Claims, 12 Drawing Figures

DRUG INTERACTION SYSTEM

The present invention also relates to procedures for using devices of the type heretofore described and to the apparatus for their operational realization.

In this manner, the present invention enables the data and nature of relationships in an at least threedimensional system to be recorded with a two-dimensional address system which may be materialized or not on the support, and with a system of suitable assessments and codes.

Hereinafter, for simplicity, the supports will be considered substantially flat (paper, films, cards, sheets, tapes, etc.) on which a system of addresses is marked in twodimensional cartesian coordinates.

Without leaving the scope of the invention, the expert in the art can readily employ the present invention with other systems of coordinates (for example, polar) or marking (for example, numerical) for the addresses of the recorded data.

The first examples will be limited for simplicity to a system of assessments of one dimension only, such as the Monge system in geometry, but it is easy for the expert in the art to consider several dimensions and to conceive a code which enables several dimensional systems to be materialized for assessments as illustrated in the following examples:

On a card for example, a set of symbols could be carried having different shapes in accordance with a first dimensional assessment series and different colours in accordance with a second dimensional assessment series.

Hereinafter, the term "element" will signify the subassembly consisting of the unit or group of units corresponding to each support; the phrase "characteristics peculiar to the element" will signify the data corresponding to the element itself and capable of being recorded on the support. These will for example be the constituents of the element such as the enumeration of the units, in the hypothesis of a group; the phrase "relationships or relational characteristics" will signify the data corresponding to the relationships between the characteristics or data peculiar to the element corresponding to one support and the characteristics or data peculiar to the other elements of the assembly (e.g. interaction, compatibility, incompatibility, negative or positive interference between elements or units constituting the different elements).

It is well known in the prior art to record element references and their characteristics on a support of any suitable type. Analytical comparison between supports enables one to know if the different characteristics are compatible when one is seeking to establish which relationships can exist between the different elements, for example where one seeks to determine whether, on the contrary, one wishes to avoid certain interactions compatibilities, incompatibilities, positive or negative interferences, or any other type of relationship which may exist between the elements and their constituent units.

To take a simple example, where an installation comprising the circulation of fluids is under construction, it is necessary for the characteristics of the different assembled elements to be compatible between themselves and not to present incompatibilities. One will notably investigate dimensional compatibilities in order that the connections may be made without difficulty, and on the contrary one will seek to avoid incompatibilities between constituent material or between each of them and the fluids designed to circulate through them.

These become operations which are often long and difficult to carry out manually and are very costly when one makes use of automatic equipment. Moreover, on existing supports the operations are generally of two dimensions, and do not allow three or more dimensional data to be recorded.

For example, the most improved punched card systems still operate with a two-dimensional address system on the card and a single-type perforation for one support only allows a relatively limited number of combinations and a data recording capacity which is insufficient for certain uses on the same support.

Manufacturers of large-capacity computers have had to move in the direction of supports comprising a considerable number of addresses by generally making use of magnetic supports which can be used in practice only with the aid of particularly costly machines. Now in many fields it is indispensable to have rapid access to data of a number of addresses of the order of 1000 to 10,000, for example, on a single support which greatly surpasses the capacity of traditional punched cards, but does so to an even greater extent when one needs to materialize the assessments themselves in a small number between 10 and a 100 or between two and 10, and one runs up against problems which are difficult to resolve without investing time or money to an extent incompatible with the means or anxiety of the user.

The single means which is used in this case requires the user to make a long and difficult comparative reading of the cards and observations, giving rise to a large number of errors.

There exists on the market card system with a large number of addresses, for example punched cards, which enable a selection to be made from an assembly of cards of all those carrying a symbol leading to the same address, for example those carrying an oblong hole at one determined point in an assembly of round holes regularly spaced in a chequer pattern.

There also exists optical means which permit the classification of photographic films forming cards provided with a chequer pattern of opaque or translucent squares which enables all cards carrying an opaque square or a translucent square in a determined address on the card to be picked out, but here again these systems cannot go beyond two pieces of information per address (0 or 1, yes or no, translucent or opaque, etc.).

If it is required to increase the capacity of the cards, one is led to perform essentially manual operations which require unremitting attention and considerable time.

Furthermore, in these previous systems, the supports only comprise two-dimensional coordinate systems.

As stated heretofore, the present invention allows operation with supports arranged with the aid of a twodimensional address system and an assessment system of at least one dimension. It allows not only the investigation of common characteristics peculiar to the data, but likewise all types of relational characteristics between the data peculiar to the various elements of the same assembly. As already stated heretofore and for the sake of simplicity, the first examples are limited to three dimensions with rectangular supports, with addresses in cartesian coordinates, the assessments being of one dimension and corresponding to the Monge height or level if the supports form the horizontal reference plane.

Now in the present state of things, the majority of devices used for comparing two-dimensional supports are not suitable for comparing supports according to the invention, in which it is necessary to distinguish marks of any actual assessment carried at any actual address in relation to marks of other assessments carried at the same address.

Hereinafter, reference is made by way of non-limiting example to a field of application in which the present invention finds an interesting use. It relates to the problem of investigating positive or negative interferences in the medical field. If, for example, a doctor draws up a prescription for a patient, it is necessary for the different medicines, and in particular their constituents, to be compatible between themselves and with the patient himself, with his mode of living, with his alimentary regime, with his climatic or professional conditions, etc. . . .

At the present time there exist no practical means enabling a systematic interference check to be made by the doctor which allows him to carry out his check precisely, rapidly and efficiently and without using a complex and costly apparatus.

The present invention therefore consists essentially in carrying on a support corresponding to each pharmaceutical speciality or constituent of a pharmaceutical speciality, notably each active substance, or corresponding to each family of pharmaceutical specialities, the different positive or negative interferences as heretofore enumerated.

It comprises in the first place placing on each support, under conditions which enable easy retrieval, the nature of the interferences with the complex of other specialities or constituents of active substances, with alimentary regimes and with other conditions of employment as indicated heretofore. To accomplish this, one may use for example a geographical address marking system on the support, for example a classic cartesian coordinate system, as stated heretofore. Then with each address is made to correspond one of the other elements with which one may make the comparison and to note the corresponding address by any recording means convenient to the actual nature of the support and the procedure employed, a symbol materializing the nature of the interference between the element to which the card corresponds and the element corresponding to the point of marking considered.

It is possible to group, for example geographically, the marking points corresponding to one family of elements in such a manner for example that the same interference is found on one easily markable zone, corresponding for example to the complex of antibiotics or to a family of food products.

The user possessing the assembly of supports corresponding to the assembly of elements extracts from it the supports corresponding to the elements for which he wishes to compare characteristics, and by any suitable means such as that described hereinafter he detects the interference symbols carried at the addresses corresponding to the various elements corresponding to the chosen supports, and simultaneously the interferences with other conditions of use which may be carried without forming the object of special supports; for example, if the user wishes to administer to a patient specialities A, B, C and D, he extracts for example from his collection the supports corresponding to A, B, C or D, to their constituents or their active substances indexed in accordance with the family to which they belong. In marking the addresses corresponding to the element carried on each of the cards (A, B, C, D, their constituents or their active substances etc.) comparison is made with the interference symbols which may be carried at the same marking point of the other supports, which enables a determination to be made of any interference between the medicines, but equally one may mark in other support zones symbols of interference with the nature of the patient (for example a diabetic, of such a sex, of such an age, of such a weight), his alimentary regime (for example absorption of alcohol), his condition of life (for example unable to do heavy work or to drive a vehicle), his climatic conditions (for example living in a tropical country), and other conditions (for example time for taking medicines, etc.).

With regard to the nature of the markings, each address must carry markings of different types to which to attribute an assessment, each assessment corresponding for example to a nature of interference. The nature of the markings may change according to the supports, it being evident that one must be able to distinguish them according to their nature, and one may envisage their being distinguished by geometry or by physical characteristics which may themselves be digital or analog and one may well conceive definition of an assessment by the measurement of a quantity linked to the mark (magnetic, optical, electrical or the like).

For a better understanding of the technical characteristics and advantages of the present invention, a description is given of various embodiments which are not limiting either in their manner of practical operation or in the applications to which they may be put, reference being made to the following Figures.

Figure 7:
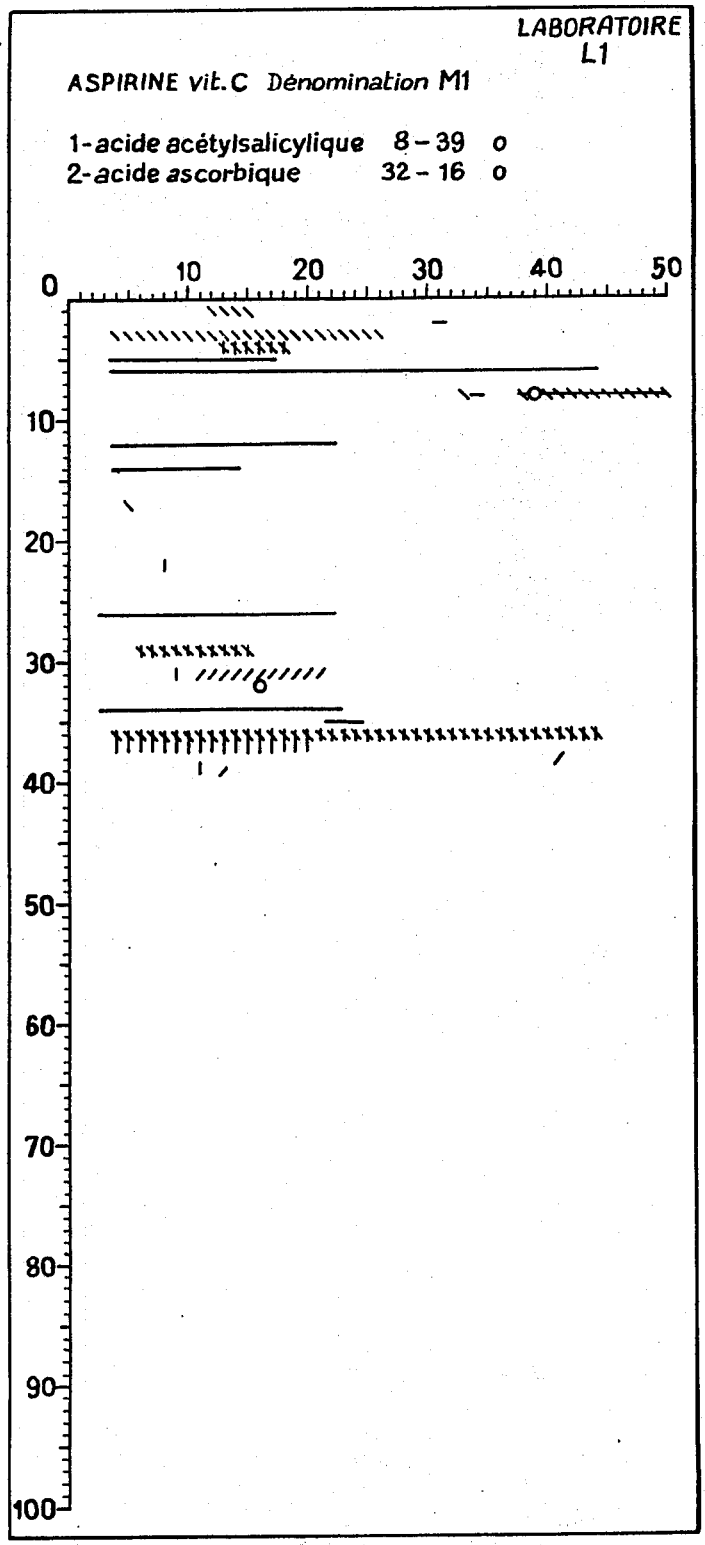
Figure 8:
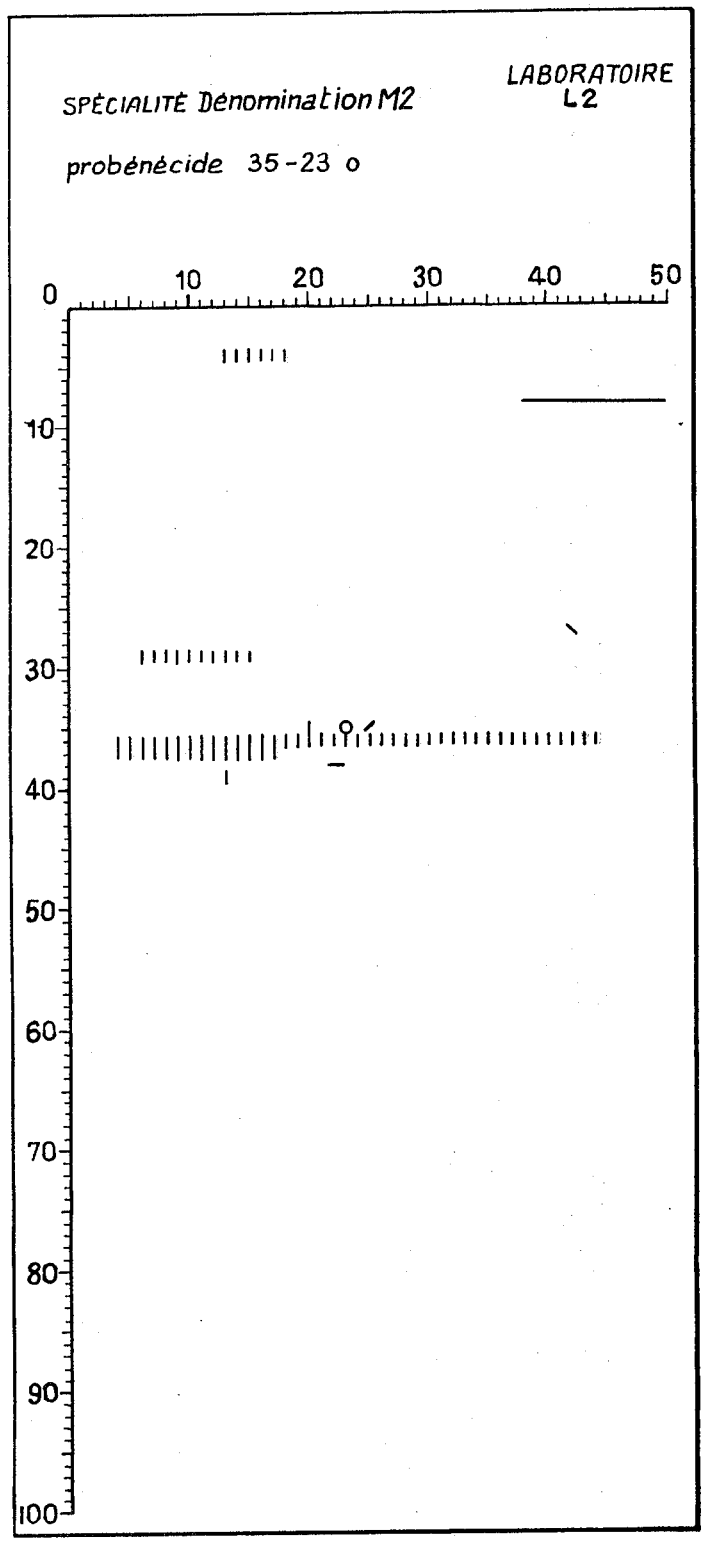

And FIGS. 7 and 8 represent a second embodiment of supports according to the invention corresponding to two pharmaceutical specialities chosen in a determined market.

EXAMPLE 1

On rectangular cards of transparent nonextendable but possibly supple material a chequer pattern of cartesian coordinates is drawn up in which each point of intersection may be considered as an address. One card and one address is made to correspond to each speciality in such a way that on a card corresponding to a given speciality one may carry at other addresses symbols corresponding to interferences, whether with other specialities at addresses provided for this purpose, or with conditions of employment such as enumerated heretofore at other addresses provided in consequence.

This card may carry opaque, translucent or coloured symbols the form of which corresponds to each of the assessments which may be materialized.

Figure 1:
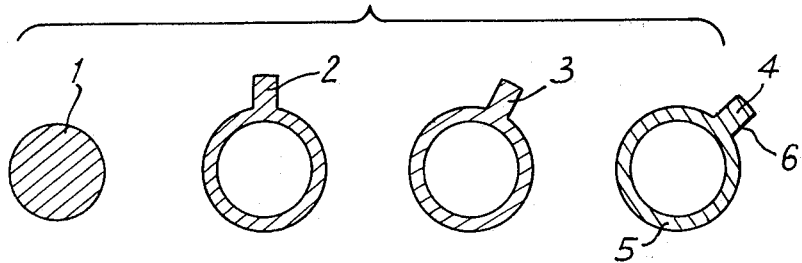
FIGS. 1 to 4 and 9 to 12 represent coded symbols according to the invention.

FIG. 1 shows a set of these symbols enlarged. For example, symbol 1 is that carried at the address corresponding to the speciality which itself corresponds to the card.

The symbol 2 corresponds for example to the assessment 1, the symbol 3 to the assessment 2, and so on.

Figure 2:
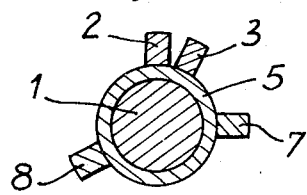
Figure 3:
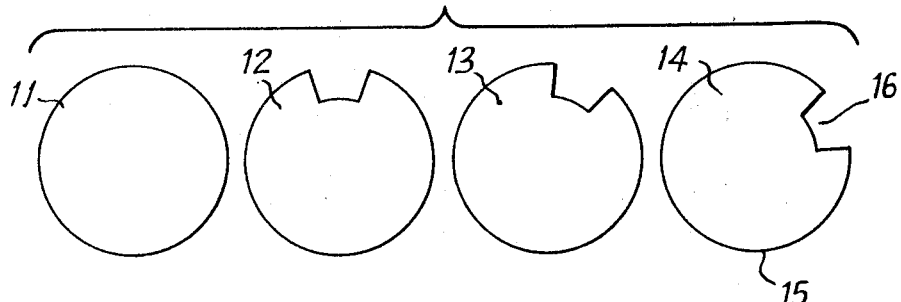
Figure 4:
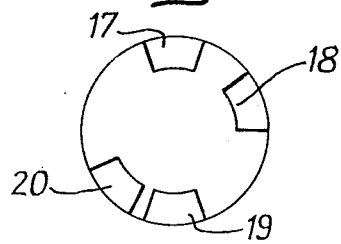

Experience shows that it is very easy to distinguish between a dozen signs such as 2, 3 or 4, composed of an annular part superimposed on a symbol such as 1, with stubs 6 placed at the periphery of 1, and projecting with regard to the rings. If the 12 stub positions are spaced by 30°, as the figures of a clock face, their position is easily distinguished, for example FIG. 2 shows around a symbol such as 1 a certain number of superimposed rings 5 and stubs 2, 3, 7 and 8 corresponding to easily identifiable assessments where, for example, as stated with relation to FIG. 1, the stub 2 corresponds to assessment 1 (position 12 on a clock), stub 3 corresponds to assessment 2, stub 7 to assessment 4, and stub 8 to assessment 9.

When the practitioner chooses from his collection of cards those corresponding for example to four specialities which he wishes to prescribe, the symbols such as 1, possibly surrounded by rings comprising one or more stubs, will appear at the four addresses corresponding to the four specialities; moreover, if the rings and stubs are coloured they are still more easily identifiable, and one can furthermore conceive that with a dozen stub positions and 8 or 9 different colours one can considerably increase the number of possible assessments which may be materialized at the same address.

If one also provides cards corresponding to the different characteristics of the subject (man, woman, from 20 to 30 years old, pregnant woman, woman subject to certain allergies, man living in hot countries, etc.), one may know the interferences of the prescribed specialities at the addresses corresponding to the characteristics of the subject.

In order to facilitate read in, one may provide a casing into which the different cards may be inserted so as to maintain the chequer pattern correctly superimposed and illuminate the assembly with Wood light, the symbols being formed from suitable materials.

In the present example a system of cartesian coordinates has been imagined, but it is evident that one may operate with other systems of coordinates. Other forms of symbols with or without coloration may equally be envisaged.

EXAMPLE 2

One may likewise operate on opaque cards comprising perforations such as 12, 13 or 14 with internally directed stubs 16, the diameter of the different perforations being substantially the same.

When superimposing the cards corresponding to the envisaged specialities and viewing them by transparency, a perforation is seen at the addresses corresponding to the specialities, inside which appear stubs such as 17, 18, 19 and 20. As in Example 1, addresses may be envisaged for the conditions of employment or the characteristics of the subject.

EXAMPLE 3

Figure 5:
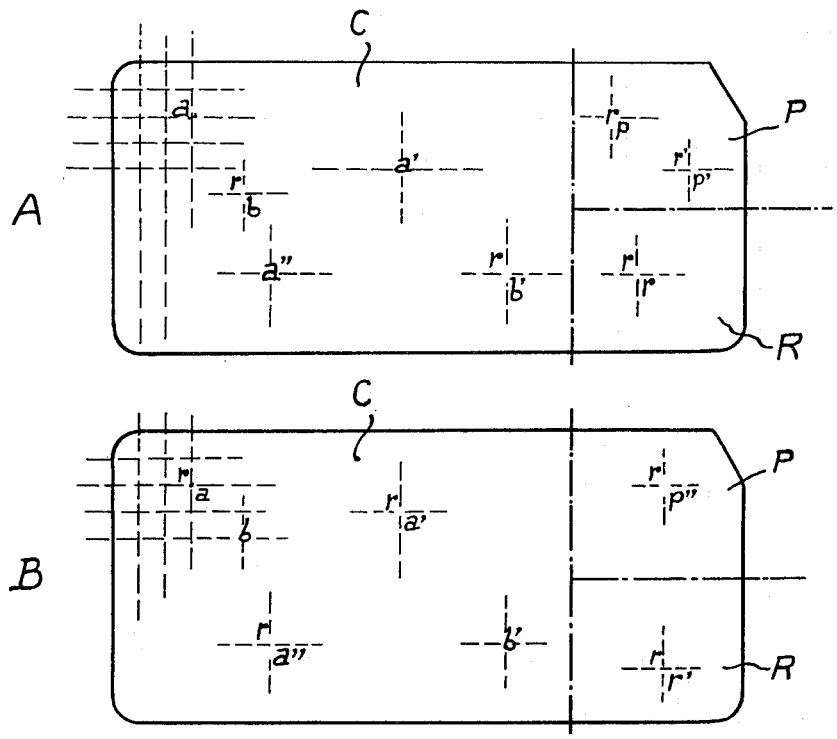
FIG. 5 represents a first embodiment of two supports according to the invention.

FIG. 5 represents diagrammatically two rectangular cards A and B, for preference of transparent semirigid material, i.e. supple to the touch but having good dimensional consistency so as to enable the card to recover its exact dimensions if it has been bent or buckled voluntarily or accidentally.

The card A corresponds to an element A, card B to an element B. They are both arranged following a chequer pattern covering the entire surface of each card and diagrammatically represented by dotted lines. The dimensions of the cards and chequer patterns must allow the superimposing of A and B with the two chequer patterns and the edges of the cards corresponding as perfectly as possible.

One may be satisfied with good superimposing of the chequer patterns if the cards are provided with marking means such as symbols or adequate perforations. This may be useful if after long usage the edges and corners of the cards risk becoming worn. One may equally bevel a corner, as is traditional in the field of punched cards for computers, so as to ensure that the cards are all disposed correctly in the card cabinet or when carrying out the comparison operation, and round the other corners to avoid their deterioration.

If it is supposed that cards of type A and B are intended for studying interactions in the field of medicine and pharmacy, the cards are geographically divided into a certain number of zones marked C, P and R bounded by chain-dotted lines. The dotted lines of the chequer pattern and the chain-dotted lines bound the zones which may or may not be materialized on the card.

Each of the intersections of the chequer patterns constitutes an information address and the zones C, P and R are identical between one card and the other so as to contain the same addresses. Zone C is reserved to the constituents of elements A and B, i.e. to the unit or group of units constituting the element.

If the element A or element B are for example medicines, the different units may be the main active or excipient constituent or constituents. If on the other hand it is preferred to have cards in which A and B are not specialities but simply constituents, the units may correspond to the different functions of the active principal, for example for the functions of the molecule.

It will be supposed hereinafter that A and B are speciality medicines and that with each address corresponds one constituent of the speciality: $a, a', a''$ in the case of speciality A; $b, b'$, in the case of speciality B.

On card A, at the addresses chosen for $a, a', a''$ are carried the coded signs or symbols which indicates that at each of the addresses on card A is recorded one characteristic or data peculiar to the element A. It has been chosen here to record constituents but one could equally conceive recording also, in a special zone, the dosage or the form in which the medicine may be administered.

For simplicity, the Figure does not carry the coded symbol but the references $a, a', a''$ to the chosen addresses. Likewise, card B carries the symbols $b, b'$ corresponding to the active substances of B.

On card A, outside the addresses of characteristics or peculiar data, all other addresses of zone C may correspond to all other active substances of the complex of considered specialities which have given rise to an assembly of cards such as A and B. It is well to keep a certain number of addresses free for new specialities which may appear on the market. It is equally well, for reasons of comfort and to allow any checks, to regroup in subzones, within C, the active substances of the same family, for example all antibiotics, acetyl salicylic acid and its derivatives, etc. In this manner, on the other addresses of zone C of card A attributed to the active substances other than $a, a', a''$ one may carry symbols such as $r_b, r_{b'}$, which correspond to the relational characteristics capable of existing between the constituents of element A and those of element B.

Likewise on card B families of signs or symbols may appear such as $r_a, r_{a'}, r_{a''}$ corresponding to the relational characteristics capable of existing between the constituents of element B on the one hand and those of element A and its units on the other hand.

These relational characteristics may correspond to interactions of any kind and in particular to incompatibilities or interferences.

It is evident that if one relational characteristic between A and B appears on card A, the same must be found at least once on card B. For example, if the sign $r_b$ of card A corresponds to a chemical interference between the active substance $a$ and the active substance $b$, on card B will be found the sign or symbol $r_a$ corresponding to $r_b$.

$r_b$ will be found on A at the same address as $b$ on B, $r_a$ will be found on B at the same address as $a$ on A. The coded signs or symbols recorded at the different addresses may be as those heretofore described.

Each pack of cards must therefore be provided with a table of addresses on the one hand and assessments on the other; for example, assessment 0 corresponds to a first symbol or first coded sign which, for simplicity, will also be called 0 corresponding, for example, to the absence of any peculiar or relational characteristic. This will be the case in the present example if there was perfect neutrality between the constituents of element A and element $b'$.

This may be expressed at $r_b$ of card A by a sign or symbol 0 which may likewise be expressed by the absence of any sign recording in the corresponding address. The assessment 1 corresponding to a sign or symbol 1 may likewise correspond to a peculiar characteristic such as at $a, a'$ or $a''$ on card A; likewise, at $b, b'$ on card B. Likewise, the other assessments 2, 3, 4 etc. may correspond to different relational characteristics, it being evident that in order to avoid errors the cards may carry as clearly as possible, for example at their upper edge, the name or the various possible names of the corresponding element and of the various units which comprise it, i.e. in the case of the present example the name or names of the speciality and the chemical or commercial name or various names of the different active substances.

Zone P may be reserved to addresses corresponding to the different characteristics of the patient (age, sex, stature, race, hereditary characteristics, illness, etc.). One may likewise envisage making cards P which carry the characteristics peculiar to the patient leaving zones C to carry the interactions or sensitivities which may be known.

On cards A and B, i.e. on those corresponding to the specialities, zone P must therefore carry relational characteristics in order to indicate for example that a certain medicine may be suitable for infants but not for aged persons, and inversely that a certain other medicine is incompatible with diabetics or with pregnant women, etc. This is expressed by relational signs $r_p, r_p'$ or $r_p''$.

With regard to zone R, this may be reserved to the alimentary regime or to the conditions of life of the patient. As in the case of zone P, one may indicate at R if the patient lives in such or such a climatic condition, in an urban or rural environment and if his work is intellectual or manual. Likewise, in zone R of cards such as A or B, an indication will be given of possible interactions with this or that mode of living, for example interferences between an active substance and the ingestion of alcohol, which would give rise to relational signs or symbols $r_r, r_r'$.

It is interesting to note that on superimposing or comparing cards corresponding to the doctor-prescribed specialities A, B and the card or cards P, R corresponding to the peculiar characteristics of the patient and his way of life, one finds at the addresses corresponding to the peculiar characteristics of the constituents of the chosen elements the relational characteristics between these elements at the same addresses on each of the other cards so selected.

It may furthermore happen that one finds at the same address coded signs or symbols corresponding to different assessments or to like assessments which may reinforce or lessen the appraisal of the practitioner in choosing or rejecting one speciality or one active substance. This can equally enable note to be taken of whether the same active substance is found repeatedly in several prescribed specialities, and which is expressed by the superimposing at the same address of several signs or symbols of characteristics or peculiar data.

If, as stated at the beginning of this example, the cards are transparent, it is easy to superimpose them, to make them coincide and to find signs of relational characteristics superimposed on signs of peculiar characteristics.

EXAMPLE 4

A system of cards may be envisaged of the same type as those of Example 3, but in which the support card assembly is made to correspond to an active substance or a group of active substances and the different addresses to the specialities. This could notably make it easy to find all the specialities or groups of specialities comprising the same active substance, which would enable its double use to be avoided, and would also enable a search to be made for additional effects, including synergetic, and would further enable a documentary or market analysis investigation to be made. By means of symbols coded in accordance with the assessments, one could further materialize dosages, forms of administration, associations with other families of medicine and other relational characteristics.

EXAMPLE 5

Returning to the conditions of Example 3, it will be recalled that one may if required play on the colorations of signs to be recorded. If, for example, the capacity of the card is such as to be able to devote a surface element corresponding to each address of such dimensions as to be able to carry out that stated hereinafter, one may use signs or symbols such as those described below. If, on the contrary, the capacity and dimensions of the card allow only a space to each address which enables the eye to distinguish details only with difficulty, reference may be made to an enlarged element situated either on another support or on the same support in a zone left free, for example in the margin.

Figure 6:
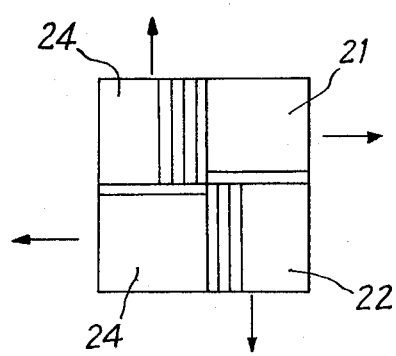
FIG. 6 represents an example of a coded symbol according to the invention.

FIG. 6 represents a symbol of this type which may be used either at each address or with back-reference if enlargement is required for purposes of legibility. The sketch of FIG. 6 is likewise enlarged for reasons of comfort. The symbolic sign represents a general square shape divided into four by two orthogonal lines, but this arrangement may apply generally to any other shape and any number of divisions provided it remains legible or discernible by the eye or by any suitable means.

For any symbol divided into $n$ zones (4 in this case) this enables sub-symbols to be provided in each of the zones, i.e. to multiply by 4 or more generally by $n$ the number of assessment dimensions. If, for example, in the case of interactions of medical products, 4 zones are provided, the zone 21 for example may be reserved for physical interactions, zone 22 for positive pharmacological interactions, zone 23 for chemical interactions and zone 24 for negative pharmacological interactions.

In the preceding phrase, use has been made of the word "interactions" which is the most frequent case, but this may just as well apply to any other relational characteristic (incompatibility, interference, etc.).

Each of the zones 21 to 24 may be the object of coloration in accordance with the chosen assessments. Furthermore, not only the chosen colour may be varied, i.e. the wavelength spectrum, but also the intensity, which corresponds on a transparent support to the transparency of the coloured symbol. This transparency of the coloured symbol may be obtained either by reducing the intensity of the colorant or the thickness of the layer, or by using regular patterns of greater or lesser fineness or space apart.

Each pattern element (for example, a line) may correspond by its colour to a given constituent, which may enable the nature of interaction involving each constituent to be made clear, according to the zone in which it is located. These various systems enable the intensity to be increased on superimposing several supports by reducing the transparency of the assembly or an intense coloration to appear by superimposing supports comprising the same reduced coloration, which corresponds in practice, for example, to different specialities comprising the same component and more especially the same active substance, each at a dosage calculated for the formula of the speciality, but which if they form the object of the same prescription, can lead to a total dosage stronger than that required.

If, for example, as indicated in FIG. 2, the symbolic signs in each of the zones are expressed by strips more or less close together, but in different directions from one square to the other, they at once improve the legibility, i.e. the distinction between the different zones 21 to 24 of the same symbol, but this may equally enable reference to be made to the observations or comments carried in the margin of the support in the direction of the different arrows corresponding to the different nature of interactions enumerated heretofore.

The use of a system of stripes, on superimposing, makes it possible to distinguish directional stripes of colours identical to those of the symbols representing the active component substances or equivalents while it nevertheless is possible, if the strips are superimposed to a certain extent, to play on the addition of colours while giving a coded meaning at one and the same time to the simple colours and colours composed by superimposing.

EXAMPLE 6

In this example, one particular embodiment is described intended for application to the complex of pharmaceutical speciality medicines constituting a definite market, in this case the French market, chosen by way of illustration.

In this case, the complex of active substances and other constituents of the complex of French specialities has been picked out and classified.

A collection of semi-rigid cards, preferably transparent and rectangular, is made up, each corresponding to a speciality in the wide sense of the term; a single card could if necessary correspond to several patterns of presentation, to several dosages or likewise to several pharmaceutical forms.

Each card carries the references of the medicine considered and the name of the manufacturer. The active substances or more generally any constituent which may involve interactions or secondary effects are likewise indicated.

A reference matrix, in this case in cartesian coordinates, is formed in the shape of a rectangle of 100 mm length by 50 mm width.

The following are figured on this matrix:

1. The active substances comprising the speciality and their main and possibly secondary pharmacological classes.

2. Their interactions and the significance of these latter with the other active substances.

3. Any interference between these active substances and certain foods, beverages and products absorbed by respiratory routes, and of other environmental factors such as sunlight, climate, altitude, etc.

4. Possible modifications of these formulas on standard paraclinical (essentially biological) tests, with due distinction between effects to be monitored and effects which disturb results.

5. Frequent or rare undesirable effects.

6. Contra-indications and precautions for use in relation to the characteristics of the patient, such as age, sex or pathological state, and to routes or methods of administration.

The individual cards per speciality are formed on a transparent support starting from an identical matrix. On superimposing two or more cards corresponding to the specialities taken during the course of any treatment, the complex of information appears immediately for overall read in and in particular the possible interactions and their most current significance.

This matrix is composed of:

40 usable columns 7 free columns for elucidation 3 columns for noting any adherence to one or some "secondary" pharmacological classes.

Each pharmacological class is assigned a number of lines in accordance with the number of active substances of the class, say X. This number is thus congruous with X modulus 40.

The active substances occupy the first 75 lines of the mother card. The three columns remaining free are used to indicate if one or more active substances of a speciality belong to one or other secondary pharmacological class.

On the cards set up according to specialities, the active substances are noted by a circle (descriptive code), a number of colours being used if the speciality comprises a number of active substances; when an active substance belongs to one or some secondary classes it is further positioned by a third of a circle of the same colour as the line or lines corresponding to this or these classes and in one of the three columns provided for this purpose.

B — Interferences between active substances (line 1 to 75)

Each interference is noted on the card of the active substance by a relational code variable according to the meaning of this interference.
Association to be avoided
Potentiation
Inhibition of effect
Interference of another nature
C — Foods, beverages and environmental factors (lines 76–77–78).

We have devoted three lines of the matrix to this usage.

The interaction between a food or an environmental factor and an active substance is indicated by a correlative code identical to the one used for interferences.

D — Standard paraclinical tests (lines 79–80–81)

Essentially, this concerns paraclinical tests represented in an official list of biological controls, to which may be added certain customary tests such as:
Electrocardiogram
Electroencephalogram
Depth of visual field measurement
Audiogram In making a card, each of these items may be coded in two ways according to whether:
the effect of the medicine induces contingent disturbances; the code is then P.
or whether on the contrary it constitutes an important factor in paraclinical monitoring; the code is then S.

E — Undesirable effects (lines 82–83–84–85)

These undesirable effects are grouped and classified by organs and sets of pathological syndromes.

Each of these items is coded in two different ways:
if frequent: F
if rare: R

F Contra-indications and precautions for use (lines 86 to 100)

This section groups the patient's characteristics, routes or methods of administration which may form:
either a counter-indication, coded: ϴ
or a simple precaution for use, coded: Z Each point of the reference matrix may thus easily be made to correspond to an active constituent, possibly another constituent, or any other data relative for example to the patients or to their conditions of life, while reserving a certain number of addresses for the future (notably for new products).

As heretofore stated, each card will carry the names or other denominations of the active substances and possible other constituents; after each of them, an indication is given as far as possible of the corresponding address on the matrix. For example, in FIG. 7, which represents the card corresponding to the speciality known commercially by the name of "Aspirin Vitamin C of the brand or name M1 produced by the L1 Laboratory" the two active substances have been indicated.
1. acetyl salicylic acid marked on the matrix by its address, i.e. ordinate 8 and abscissa 39.
2. ascorbic acid marked on the matrix by its address, i.e. ordinate 32 and abscissa 16.

Likewise, in FIG. 8 corresponding to the speciality known, commercially, by the name M2, produced by the L2 laboratory, the active substance is marked by its address in like manner: probenecide 35–23.

On the common or mother matrix, it is recommended to group the active constituents of one family in the same zone, for example on the same line. The ordinates are then divided by attributing one or more lines to a family:
1 — General anaesthetics
2 — Local anaesthetics
3 — Hypnotics
4 — antiepileptics, etc.

Likewise, these families will themselves be grouped into larger families, for example:
1 to 11 depressants of the central nervous system
12 to 14 stimulants of the central nervous system
15 to 17 medicines of the vegetative nervous system etc.

As stated heretofore, to facilitate marking, the correlative symbols or signs are the same colour in each case as the corresponding circle. It should be noted that on united figures which are black on a white background, confusion is introduced between the colours of the different signs or symbols which does not exist in reality.

To facilitate recognition, a colour code is preferably followed corresponding to the order of listing of the active substances on the speciality card.

In FIG. 7, the following signs are given which correspond to interactions with the products or families the addresses of which are indicated. For simplicity, all signs corresponding to secondary effects have been omitted. On the sample or mother matrix, the abscissas 1 to 3 are reserved over the entire height of the ordinates for these latter, but it is evident that one may equally, without leaving the scope of the present invention, reserve any other matrix zone for this purpose.

Signs corresponding to acetyl salicylic acid and all of the same colour:

| - type A - interactions with | |
|---|---|
| anorexiants | 12,4 to 12,22 |
| IMAO | 14,4 to 14,14 |
| neuroleptics | 6,4 to 6,44 |
| procaine | 2,31 |
| antiparkinsonians | 5,4 to 5,17 |
| anticoagulants (oral) | 26,3 to 26,22 |
| corticosteroids | 34,4 to 34,22 |
| phenylbutazone | 8,34 |
| salicyls | 8,38 to 8,50 except 8,39 (acetylsalicylic acid) |
| uricosurics | 35,22 to 35,24 |
| - type B - interactions with | |
| phenobarbital | 3,21 |
| - type C - interactions with | |
| paraminobenzoic acid | 38,41 |
| antithyroids | 31,11 to 31,21 |
| PAS | 39,13 |
| - type D - interactions with | |
| diphenylhydantoin or phenytoin | 22,8 |
| sulfamides | 4,13 to 4,18 |
| | 29,6 to 29,15 |
| | 36,4 to 36,44 |
| penicillens | 37,4 to 37,20 |
| thyroxine | 31,9 |

Signs corresponding to ascorbic acid and all of a second colour.

| - type B - interactions with: | |
|---|---|
| antipyrine or phenazone | 8,33 |
| antropine | 17,5 |
| barbiturates | 1,12 to 1,15 |
| | 3,4 to 3,26 |
| salicyls | 8,38 to 8,50 (8,39 corresponds to acetylsalicylic acid, another active substance of said speciality) |
| sulfamides | same addresses as above |

FIG. 8 shows the following signs or symbols which correspond to interactions with the active substance of the speciality considered (probenecide)

| - type A | - interactions with erythromycine | 38,22 |
|---|---|---|
| - type B | - interactions with ethacrynic acid | 27,42 |
| - type C | - interactions with allopurinol | 35,25 |
| - type D | - interactions with endometacine | 35,20 |
| PAS | | 39,13 | penicillins and sulfamides same addresses as above.

For reasons of simplicity, this example does not show the other symbolic signs corresponding to secondary or side effects, environmental conditions, peculiar characteristics of the patient, etc.

However, it could be advantageous to show in the form of arcs of circles (thirds of circles for example) of the same colour as that chosen for the active substance considered, the adherence to a pharmacological class other than that considered for positioning the product on the mother matrix. For example, aspirin symbolized by a full circle in the antalgic class may appear in the form of arcs in the anti-inflammatory, antipyretic or platelette anti-aggregating classes.

If, for example, the abscissas 4 to 50 of one line of the mother matrix have been reserved for a family of active constituents, the free space corresponding to the abscissas 1 and 3 may be used to show arcs of circles corresponding to secondary effects. In this manner, one may see the axes corresponding to the different constituents of one speciality or several specialities lying side by side if one superimposes the cards, and this could be in the form of a series of signs ( ( ( ( without taking account of the chequer pattern of the matrix with regard to the abscissas. One may also show cumulations of main and/or secondary pharmacological effects, which would allow explanation of certain reactions of the overdose type which at present remain unexplained.

Furthermore, by superimposing two or more transparent cards such as those of FIGS. 1 and 2, in such a manner as to make the coordinate axes and consequently the matrices coincide, if the cards correspond to the specialities prescribed for any treatment, the coded signs or symbols superimposed on the circles corresponding to the addresses of the active substances or constituents to be considered correspond to interactions, the nature of which is defined above and defined by the term assessment.

As emphasized, in general terms a double correspondence must always exist: if the substance X has an interaction with the substance Y it must equally be found at the address of X on the card corresponding to Y as at the address of Y on the card X.

This correspondence need not be identical; for example X may reduce the activity of Y without its own being reduced.

Moreover, the supports according to the invention permit permanent self-checking of their exactness because of the fact that any information which does not appear twice when using the supports corresponds to an error or oversight in setting up.

Each card may be accompanied in any suitable form by useful complementary details on the mechanism of the indicated interactions, their significance, and bibliographical references.

In particular, it is advantageous for each of the cards to be contained in a simple card-holder of the open Bristol folder type to facilitate classification and consultation, and which clearly show:

on the back, general information on the product giving the legal data in an order identical for all the cards and in a sequence and grouping which are both logical and of practical interest to the user.

inside, a clear transcription of the interferences, the effects and other data represented in code on the transparent cards.

Thus, when practitioners arrange corresponding cards, their prescription may be easily and rapidly re-examined by them, and the interactions or undesirable effects avoided by a single viewing to give revision of their basic prescription and consequently not giving rise to loss of time during daily practice.

Starting from this new base, further modifications to their prescription will be made at a rate and to a degree governed by requirements and new information added in the form either of additional cards carrying new products, or renewal of cards, or of additions which they will themselves transcribe at a reading or for information while awaiting an "updated renewal".

EXAMPLE 7

The procedure may follow that of Example 1, but the support be formed by a photographic process, for example on microfilms. It is then possible not only to carry signs at the different addresses, but equally to include texts on the card enabling the user to find observations or information according to the weight and age of the patient.

The photographic process also enables a film or microfilm to record the table representing the support on a large scale and on which it is easier to carry the signs at the required addresses. The negatives may be easily superimposed by an optical method, for example by projection either of negatives superimposed behind the same projection lens or by a projection lens for each negative, the different projected images being superimposed on a common screen.

EXAMPLE 8

On a support consisting of a rectangular preferably rigid or semi-rigid card and comprising a magnetic coating, addresses corresponding to a chequer pattern in accordance with rectangular coordinates are determined and magnetic signals are recorded by any traditional process at the addresses corresponding to the desired specialities and characteristics.

Numerous methods exist for recording which give great precision at the addresses and which allow a wide variety of forms or intensities of signals, so enabling a considerable number of assessments to be determined at each address.

As in the case of traditional cards, as often as not 5,000 addresses are disposed to which a character may be assigned chosen from at least 25 different symbols coded according to the invention.

Each card corresponds, for example, to a pharmaceutical speciality and may be advantageously contained in a card-holder analogous to that described in Example 6.

According to one modification, a magnetic tape of current type is used having a capacity equal to that of 25 to 200 magnetic cards described above. Each tape may then relate either to a therapeutical class of medicines or be assigned to a complex of specialities of a determined laboratory, or to any other desired classification.

One of the advantages of magnetic supports is the fact that these supports may be modified without any large technical problem, notably when new interferences come to light, these modifications being made with devices analogous to those of the memory typewriters at present available.

The practical operation of the process according to the invention in the case of magnetic supports may be done in the following manner whether the support is a tape, a card or a disc.

The card or portion of tape assigned to a first speciality is inserted into a read-in unit comprising a central memory, and in the case of a tape a control keyboard which enables the addresses of the speciality considered to be selected. The characteristics found at the addresses of this speciality then pass into the central memory.

Likewise, the characteristics of the addresses of a second, third, etc. speciality are inserted and are precisely superimposed on the addresses of the first speciality by a synchronization system.

It remains then only to pass the assembly of superimposed characteristics corresponding for example to the interferences between the specialities considered in withdrawing the characteristics from the central memory, to a read-in unit such as a cathode ray screen, possibly provided with a device allowing reproduction of the information read on the screen, a tracing board or a traditional printer.

This type of recording allows easy remote retransmission of the reproductions and comparisons of a large number of supports with the aid of equipment easily constructable by an expert of the art starting from traditional elements.

The procedure may equally be electrical and not magnetic varying the signals according to the assumption, either in a digital or analog manner.

Devices such as described in the preceding examples may be subjected to various modifications and find wide application.

With regard to this latter, the medicine and pharmacy field offers numerous possibilities. Study may be made for example of other problems than interferences, and one may equally well, for example, study prescriptions taking account of the constitution or type of individual in the homeopathic field.

Continuing with the subject of applications, a precise study may be made of the important problem in medicine and pharmacy of superimposing doses and also, separately or in combination, the problem of feeding, notably for babies.

Again, on a general level, where it is required to show up the interactions existing between an active substance of a speciality and the assembly of active substances of the other specialities of a definite market, for example the French market, any one speciality is found to exist in different pharmaceutical forms (pomade, tablets, capsules, ampoules, etc.) in different dosages intended for different roads of administration.

Now interactions between the active substances of a speciality and those of other specialities often vary considerably with the above characteristics.

Moreover, any interactions between the active constituents of several specialities may vary in accordance with the prescribed posology and in particular the simultaneousness or otherwise of the doses, their frequency and the rapidity or delay in absorbing or eliminating the medicines.

It is consequently important to be able to take account of these data in the practical operation of the procedure and construction of the device according to the invention as described heretofore. Furthermore, the symbolic signs may be coded in accordance with the characteristics of the speciality considered.

More precisely, this code may be a function of the pharmaceutical form of the speciality considered, the particular dosage of its active substances, its road of administration, and its prescribed posology, in particular the simultaneous or otherwise of the doses of this speciality with those of the other specialities.

Moreover, the coded symbolic signs may be the first symbolic sign corresponding to the address of each active constituent of the speciality, this first symbolic sign being a circle centred on the point of intersection of the matrix corresponding to said address, this circle having a colour which is peculiar to said constituent, the first symbolic sign possessing a portion of different colour to the colour peculiar to said constituent, and this portion of the circle being defined in accordance with the characteristics of the speciality considered.

According to other embodiments, the coding of the first symbolic sign comprises a circle centred on the point of intersection of the matrix corresponding to said address, this first circle having a colour peculiar to said component, and a second circle which may be centred as the first circle, but of diameter at least equal to the diameter of this first circle, of which at least a portion possesses a different colour than the colour peculiar to said constituent, and this portion of the circle being defined in accordance with the characteristics of the speciality considered.

On the other hand, the coded symbolic signs may be those corresponding to interactions, these symbolic signs being right segments centred on said points of intersection, the length of which corresponds substantially to the diameter of said circles and the position of which corresponds to a predetermined code, these segments able to possess a portion of colour different to the colour peculiar to said constituent, said portion being defined as a function of the characteristics of the speciality considered.

A further embodiment of the coding of symbolic signs relative to interactions may consist of the use of part of the first right segments centred on said points of intersection, the length of which corresponds principally to the diameter of the circles and the position of which corresponds to a determined code, these first right segments being of a colour peculiar to said component, and also second segments parallel to the first and of like length, comprising at least one portion of colour different from the colour peculiar to said constituent, this segment portion being defined in accordance with the characteristics of the speciality considered.

Furthermore, the addresses of active constituents may be grouped by zones corresponding to the families of active constituents in accordance with a matrix common to the assembly of cards, these zones being grouped into several regions. Each of these regions may comprise an address zone reserved to secondary effects, in particular in such a manner as to indicate which constituents may adhere to other families in addition to their own address.

Symbolic signs for secondary effects of the constituents corresponding to the card considered may be carried at the addresses of said reserve zones.

Finally, at least part of the cards may be such that each card of this part is relative either to a class of specialities or active constituents, or to an assembly of specialities or active constituents able to treat one or an assembly of determined illnesses, or to a determined type of subject.

EXAMPLE 9

Figure 9:
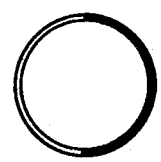
Figure 10:
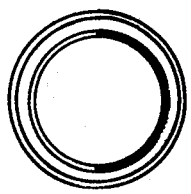

FIGS. 9 and 10 represent two codings, differing according to the characteristics of a speciality, of symbols representing the active constituents of this speciality and carried on the card corresponding to this speciality at their respective addresses.

EXAMPLE 10

Figure 11:
Figure 12:

FIGS. 11 and 12 represent two codings, differing according to the characteristics of a speciality, of symbols representing interactions, i.e. correlative signs defined in the main patent and its additions.

As stated heretofore, any interactions between the active constituents of the specialities depend on the characteristics of them, i.e. on their gallenic forms, dosages, roads of administration and prescription conditions.

As an example of a possible interaction which is a function of the gallenic form, glucocorticoids may be mentioned which, if used in a pommade of which the excipient is penetrating, they can interact with active constituents of a speciality taken by a general road, while with a non-penetrating excipient these interactions do not appear.

With regard to interactions which are a function of the posology used, an example is aspirin which in small doses, i.e. between 0.5 and 1.5 grams per day, increases hyperuricemia by blocking the tubular elimination of uric acid. In this case, administration of aspirin in small doses at the same time as traditional uricosurics must be avoided.

On the contrary, in strong doses, i.e. above 3 grams per day, aspirin has a uricosuric effect of such a type that its interactions with specialities comprising uricosurics are no longer to be feared.

As an example of interaction which is a function of the road of administration, mention may be made of injectable products of the penicillin class such as ampicillin, methicillin, etc., which administered in the same syringe or the same perfusion liquid, deactivate aminoglycosides such as kanamycin or gentamycin.

On the contrary, when these are administered separately or by different roads, for example one intravenously and the other intramuscularly, the de-activation is no longer produced.

As an example of interaction which is a function of the medical prescription and more particularly of the timing of doses as defined by the prescriber, mention may be made of PAS which, if it is absorbed jointly with isoniazide, inhibits the digestive absorption of this latter, whereas this effect disappears when the doses of each active substance are spaced apart.

Consequently, the possible interactions of the active substances of one speciality with those of the other specialities may be a function of that called in the present description the characteristics of the specialities, this term embracing the complex of factors of the type heretofore described by way of example.

According to these improvements, the symbolic signs are coded as a function of the characteristics of the speciality to which they refer.

Likewise, for example, on the card of a speciality comprising ampicillin in injectable form, one could code the circle carried at the address reserved for ampicillin and which is of a colour characteristic of this latter, by colouring one portion of this circle a different colour, this portion of the circle coloured differently signifying that in the injectable form the possible interactions with certain active constituents, and especially aminoglycosides, depend upon simultaneous administration in the same syringe.

The significance of this coding may be stated at the head of the card, to the side of the statement of the speciality such as heretofore described.

In the same manner, the symbolic signs of the correlative code may be coded reserving a portion of the segments of colour relative to the interactions, this segment portion being of a colour which differs according to the characteristics of the speciality considered.

In the same manner, two concentric circles or two superimposed lines may be used (FIGS. 10 and 12) if one wishes to show the interactions of an active substance with the other active substances on the one hand, and the variations of these interactions with one or more characteristics of the specialities which contain them on the other hand.

The coding described heretofore is given only by way of non-limitative example, this coding being nevertheless particularly satisfactory in that it is simple and easy to read, and does not increase the selling price of the print.

EXAMPLE 11

A description has also been given of cards relative to pharmaceutical specialities conceived starting from a mother matrix in which each line comprises 50 abscissas.

Elsewhere, it has been indicated that the addresses of the active constituents may be grouped by zones corresponding to families of active constituents.

Finally, mention has been made of the possibility of reserving zones for secondary effects, for example reserving in the case of each line corresponding to a family of active constituents, abscissas 1 to 3 at which arcs of a circle are represented of a colour identical to the active constituents, these arcs of a circle corresponding to secondary effects, i.e. indicating that the said active constituents belong to other families.

According to one particularly advantageous modification concerning the didactic character of the invention, the common matrix may be considered to consist of three regions in which zones corresponding to families of active constituents are grouped.

These three regions preferably comprise columns of equal height, i.e. carrying the same number of ordinates.

The first region is preferably formed of lines comprising 25 abscissas, one abscissa being reserved for secondary effects, 20 abscissas for symbolic signs relative to existing active constituents and their interactions and 4 abscissas reserved for new constituents which will later appear.

The second region is composed of lines of 15 abscissas of which one abscissa is for secondary effects, 11 abscissas for existing active constituents and 3 for new constituents, whereas the third region possesses lines of 10 abscissas of which 1 is for secondary effects, 7 for existing active constituents and 2 for new constituents. This division permits better classification and better didactic presentation of the common matrix because of the multiplication of lines.

In the same way, it may be interesting to use not one matrix of which the elements are grouped by lines or columns, which would risk leaving the ends of lines or columns for example unused, but to divide the classes or sub-classes of active constituents one after the other, as the phrases of a paragraph, but separating them by a blank space analogous to a punctuation, inside which appear distinctive signs, for example those relative to secondary effects.

Finally, cards have been envisaged in particular relative to each speciality, and it has been elsewhere mentioned that the device, the procedure and the apparatus possess numerous applications notably in the medical-pharmaceutical field.

To facilitate the work of the prescribers, notably doctors, in the assembly of cards according to the invention at least part of these cards are advantageously such that each of the cards of this part is relative to a class of specialities suitable for treating one or a complex of determined illnesses, or is relative to a determined type of illness.

For example a card may be made relative to diabetics on which will be represented all incompatibilities and interactions of the assembly of active constituents with this type of patient.

When the doctor prescribes a speciality for a diabetic, he needs only to superimpose the card relative to diabetics on those relative to prescribed specialities or to a group of specialities in order to be averted of possible incompatabilities.

Likewise, cards may be made relative to to the patient himself and his characteristics (age, sex, constitutional or acquired syndromes, etc.) which by superimposing on other cards relative to medicines, groups of medicines or illnesses, allow dangerous therapeutics to be eliminated and the choice of the prescriber to be guided.

With regard to materialization of the assessments and addresses, they may evidently always be coded directly or indirectly, digitally or analogically, especially with regard to assessments, for analogy as already stressed. This can have the advantage of allowing the formation of three-dimensional matrices which can be referred to a body of data or characteristics or more generally to a reference table or dictionary giving all the information peculiar to each of the studied elements of comparison.

With regard to the formation of the supports according to the invention, a certain number of techniques exist which allow their manufacture to be simplified, for example for numerous medicines which interfere with antibiotics, consideration could be given to uniformly colouring the whole zone reserved on each support for antibiotics, referring to Example 1, which makes it more easily readable and makes any interference with the products materialized with an entire family of addresses stand out very clearly and particularly easily. Inversely, the supports corresponding to the various antibiotics may carry large zones of incompatibility corresponding to families of products incompatible with antibiotics.

As demonstrated heretofore, the present invention finds its application, among others, in the medical or pharmaceutical field where the investigation of interactions or incompatibilities is fundamental to the doctor in drawing up the prescription and its execution by the pharmacist, but the expert in the art will find numerous other uses without modifying the concent of the invention in very different fields, for example in agriculture in choosing fertilizers according to the ground and cultures, or more generally in all fields co-operation may be made to take place between at least two elements or where interactions are to be sought or avoided, and in the field of human, animal or vegetable alimentation and as a general rule in all those fields in which the correlative characteristics between the elements may be brought to notice.

What we claim is:

1. Device for determining the nature of relationships between on the one hand data peculiar to one unit or a group of separate units, and on the other hand data of another unit or another group of separate units pertaining to the same assembly, comprising a transparent support corresponding to each unit or group of units, each support being arranged by means of a matrix of addresses, wherein on the support corresponding to each unit or groups of separate units are inscribed, at any address, corresponding to the data peculiar to the other units or group of separate units, one or more symbols distinctive of each nature of relationship between the data peculiar to the unit or groups of separate units corresponding to each support and the data peculiar to the other units or groups of units of the assembly, so that the symbols may be simultaneously read when superimposing the cards corresponding to the relationship to be studied.

2. Device as claimed in claim 1, wherein at the addresses corresponding to the data peculiar to the unit or group of units corresponding to said support, circular signs centered on the point of intersection of the matrix corresponding to the address are carried distinctive of these peculiar data.

3. Device as claimed in claim 1, wherein all the distinctive signs correspond to altitudes which are a function of the nature of the relationships.

4. Device as claimed in claim 1, wherein the address is two-dimensional and the address/altitudes assembly is at least three-dimensional.

5. Device as claimed in claim 1, wherein the distinctive signs consist of symbols divided into several zones each corresponding to a one dimensional series of altitudes.

6. Device as claimed in claim 1, wherein the symbols are materialized by colored signs corresponding to a predetermined code.

7. Device as claimed in claim 1, wherein the supports corresponding to the data or groups of data the characteristics of which are to be compared may be superimposed so that the homologeous addresses of each card coincide and comparison may simultaneously be made address by address and altitude by altitude of the symbols liable to coincide.

8. Device as claimed in claim 1, wherein the data pertains to medical prescriptions.

9. Device as claimed in claim 1, applied to the determination of interactions between active components of specialties comprising one card peculiar to each speciality or to each active consituent, each card being arranged by means of a system of addresses common to the assembly of cards, wherein on each card is reproduced a common matrix on which one address is assigned to each active substance to be considered, a first symbolic sign indicating for each constituent corresponding to the card the corresponding address, a series of symbolic coded signs representing, at all or part of the other addresses of the common matrix, any interactions between the components corresponding to the card and those corresponding to said other addresses.

10. Device as claimed in claim 9 wherein the cards are rectangular.

11. Device as claimed in claim 9 wherein the addresses of the active constituents are grouped by zones corresponding to the families of active constituents.

12. Device as claimed in claim 11, wherein each matrix line corresponding to a given ordinate is attributed to one family of active substances.

13. Device as claimed in claim 10, wherein when one card corresponds to a speciality comprising several active substances, and the symbolic signs corresponding to each of the constituents and to its interactions are of a color peculiar to said constituent.

14. Device as claimed in claim 13, wherein colors are issued to the components carried on any one card in accordance with a code corresponding to the order of listing of the components carried on said card.

15. Device as claimed in claim 1, wherein the diameter of said circular sign is at most equal to the distance between two consecutive points of intersection of the common matrix.

16. Device as claimed in claim 1, wherein the other symbolic signs corresponding to interactions are right segments centered on said points of intersection, the length of which corresponds substantially to the diameter of said circular signs and the position of which corresponds to a predetermined code.

17. Device as claimed in claim 9, wherein at least one zone of the addresses of the matrix is reserved for secondary effects.

18. Device as claimed in claim 17, wherein some addresses of said zones are reserved for indicating if the constituents can belong to other families in addition to their own address.

19. Device as claimed in claim 17, wherein said reserved zones are situated in the immediate vicinity of the zones corresponding to the addresses of the active constituents of said family.

20. Device as claimed in claim 17, wherein each component in said reserved zones is represented by a symbol of the color chosen for the composition considered.

21. Device as claimed in claim 12, wherein other addresses are reserved for environmental conditions of the subjects to be treated and for corresponding interactions and secondary effects.

22. Device as claimed in claim 21, wherein certain addresses are reserved for products of the beverage, food and tobacco type, or to their constituents, and to the corresponding interactions and secondary effects.

23. Device as claimed in claim 21, wherein certain addresses are reserved for modifications induced in biological analyses and paraclinical tests.

24. Device as claimed in claim 21, wherein other addresses are reserved for characteristics peculiar to subjects.

25. Device as claimed in claim 21, wherein other addresses are reserved for side effects.

26. Device as claimed in claim 17, wherein the symbolic signs of the secondary effects of the constituents corresponding to the considered card are carried at the addresses of said reserved zones.

27. Device as claimed in claim 17, wherein the symbolic signs consist of patterns of a type comprising ideograms and letters of the alphabet.

28. Device as claimed in claim 9, wherein the symbolic signs are coded according to the characteristics of the speciality considered.

29. Device as claimed in claim 28, wherein the code for the symbolic signs is a function of the pharmaceutical form of the speciality considered.

30. Device as claimed in claim 29, wherein the code for the symbolic signs is a function of the particular dosage of the active constituents of the speciality considered.

31. Device as claimed in claim 28, wherein the code for the symbolic signs is a function of the way of dispensing of the speciality considered.

32. Device as claimed in claim 28, wherein the code for the symbolic signs is a function of the posology of the speciality considered.

33. Device as claimed in claim 32, wherein the posology comprises an indication as to whether the dosage of the specialty considered are simultaneous or otherwise with those of other specialities.

34. Device as claimed in claim 29, in which the coded symbolic signs are the first symbolic sign corresponding to the address of each active constituent of the speciality, the first symbolic being a circular sign centered on the point of intersection of the matrix corresponding to said constituent wherein one portion of this circular sign is of a color different from the color peculiar to said constituent, this portion of the circular sign being defined in accordance with the characteristics of the speciality considered.

35. Device as claimed in claim 28, in which the symbolic signs are the first symbolic sign corresponding to the address of each active constituent of the speciality, this first symbolic sign comprising a circle centered on the point of intersection of the matrix corresponding to said address, this first circle having a color peculiar to said constituent, wherein a second circle centered as the first circle but of a diameter at the most equal to the diameter of this first circle comprises at least one portion of a color different from the color peculiar to said constituent, said portion of the circle being defined in accordance with the characteristics of the speciality considered.

36. Device as claimed in claim 28, in which the coded symbolic signs are those corresponding to interactions, these symbolic signs being right segments centered on said points of intersection, the length of which corresponds substantially to the diameter of said circles and the position of which corresponds to a predetermined code, wherein one portion of this segment is of a color different from the color peculiar to said constituent, this portion of the segment being defined in accordance with the characteristics of the speciality considered.

37. Device as claimed in claim 28, in which the coded symbolic signs are those corresponding to interactions, these symbolic signs being the first right segments, of color peculiar to said constituent, centered on said points of intersection, the length of which corresponds substantially to the diameter of the circles and the position of which corresponds to a predetermined code, wherein second segments parallel to the first right segments and of like length comprise at least one portion of a color different from the color peculiar to said constituent, this portion of segment being defined in accordance with the characteristics of the speciality considered.

38. Device as claimed in claim 28, in which the addresses of the active constituents are grouped by zones, corresponding to families of active constituents, wherein the matrix common to the assembly of cards comprises several regions which group together a collection of zones corresponding to families of active constituents.

39. Device as claimed in claim 26, wherein addresses of said zone reserved for secondary effects indicate that the components may belong to other families in addition to their own address.

40. Device as claimed in claim 38, wherein signs symbolic of secondary effects of the constituents corresponding to the considered card are carried at the addresses of said reserved zones.

41. Device as claimed in claim 26, wherein at least part of the cards is such that each card of this part is relative to one class of specialties or active constituents.

42. Device as claimed in claim 26, wherein at least part of the cards is such that each card of this part is relative to a determined type of subject.

* * * * *

UNITED STATES PATENT AND TRADEMARK OFFICE
CERTIFICATE OF CORRECTION

PATENT NO. : 3,979,839

DATED : September 14, 1976

INVENTOR(S) : Blanie

Page 1 of 3

It is certified that error appears in the above-identified patent and that said Letters Patent are hereby corrected as shown below:

Change the inventor's name from "Paul Marie Michel Jean Blanie" to --Jean Marie Michel Paul Blanie--.

Column 1, after "DRUG INTERACTION SYSTEM" insert the following:

--This invention relates to a device for determining the nature of relationships between on the one hand data peculiar to one unit or group of separate units, and on the other hand data of another unit or another group of separate units pertaining to the same assembly, the device comprising a support corresponding to each unit or group of units, each support being arranged by means of a system of addresses at which the data peculiar to the unit or to the group of units corresponding to this support are recorded, wherein on any support corresponding to one unit or a group of separate units are recorded at any address corresponding to the data peculiar to the other units or group of separate units, one or more symbols distinctive of each nature of relationship between the data peculiar to the unit or groups of separate units corresponding to each support and the data peculiar to the other units or groups of units of the assembly.

UNITED STATES PATENT AND TRADEMARK OFFICE
CERTIFICATE OF CORRECTION

PATENT NO. : 3,979,839

DATED : September 14, 1976

INVENTOR(S) : Blanie

It is certified that error appears in the above-identified patent and that said Letters Patent are hereby corrected as shown below:

On each support, symbols distinctive of these peculiar data are recorded at the addresses corresponding to the unit or group of units corresponding themselves to said support. At the other addresses are recorded the distinctive symbols corresponding to the nature of the relationships between the data of the said units or groups of units, on the one hand, and the data of the other units or groups of units of the assembly on the other hand, these distinctive symbols corresponding to that which will hereinafter be called "assessments", being functions of the nature of the relationships materialized by the distinctive symbols in coded form.--

Column 1, line 8, change "threedimen-" to -- three-dimen- --.

Column 1, line 16, change "twodimensional" to --two-dimensional--.

Column 2, line 60, change "twodimensional" to --two-dimensional--.

Column 5, line 49, delete "16" and insert therefor --6--.

Column 6, line 36, delete "for", second instance, and insert therefor --to--.

UNITED STATES PATENT AND TRADEMARK OFFICE
CERTIFICATE OF CORRECTION

PATENT NO. : 3,979,839
DATED : September 14, 1976
INVENTOR(S) : Blanie

Page 3 of 3

It is certified that error appears in the above-identified patent and that said Letters Patent are hereby corrected as shown below:

Column 19, line 36, delete "to", second instance.

Column 20, line 7, after "fields" insert --where--.

Column 22, line 4 of Claim 34, after "symbolic" insert --sign--.

Signed and Sealed this

Fifth Day of April 1977

[SEAL]

Attest:

RUTH C. MASON
*Attesting Officer*

C. MARSHALL DANN
*Commissioner of Patents and Trademarks*